United States Patent
Otsuka et al.

(10) Patent No.: US 9,221,222 B2
(45) Date of Patent: Dec. 29, 2015

(54) MOLDING DIE FOR MULTICOLORED MOLDING, MOLDING METHOD OF MULTICOLORED MOLDED PIECE, AND MULTICOLORED MOLDED PIECE

(71) Applicant: Olympus Corporation, Tokyo (JP)

(72) Inventors: Yoshitaka Otsuka, Hino (JP); Kazuhiro Kikumori, Tama (JP); Akihiro Hatori, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/939,264

(22) Filed: Jul. 11, 2013

(65) Prior Publication Data

US 2013/0323483 A1    Dec. 5, 2013

Related U.S. Application Data

(63) Continuation of application No. PCT/JP2012/057960, filed on Mar. 27, 2012.

(30) Foreign Application Priority Data

Apr. 11, 2011  (JP) ................................. 2011-087620

(51) Int. Cl.
| | |
|---|---|
| *B29D 11/00* | (2006.01) |
| *G02B 7/02* | (2006.01) |
| *G02B 23/24* | (2006.01) |
| *B29C 45/16* | (2006.01) |

(52) U.S. Cl.
CPC .......... *B29D 11/0073* (2013.01); *B29C 45/162* (2013.01); *B29D 11/0048* (2013.01); *G02B 7/022* (2013.01); *G02B 23/2423* (2013.01); *G02B 23/2476* (2013.01); *B29C 2045/1682* (2013.01); *Y10T 428/24942* (2015.01)

(58) Field of Classification Search
CPC .......... B29D 11/0073; B29D 11/0048; B29C 45/162; B29C 2045/1682; G02B 23/2476; G02B 7/022; G02B 23/2423; Y10T 428/24942
USPC .............................. 428/212; 425/344; 264/1.7
See application file for complete search history.

(56) References Cited

U.S. PATENT DOCUMENTS

| | | | |
|---|---|---|---|
| 2,559,860 A | | 7/1951 | Fay |
| 3,499,075 A | * | 3/1970 | Sherman ........................ 264/230 |
| 2003/0201570 A1 | | 10/2003 | Sasatani et al. |
| 2006/0012749 A1 | | 1/2006 | Ai |
| 2008/0014820 A1 | | 1/2008 | Goraguer |
| 2010/0073782 A1 | * | 3/2010 | Kim et al. ..................... 359/819 |

FOREIGN PATENT DOCUMENTS

| | | |
|---|---|---|
| CN | 1448260 A | 10/2003 |
| JP | S60-230813 A | 11/1985 |
| JP | 11-221839 | 8/1999 |
| JP | 2004-01424 | 1/2004 |
| JP | 11-221839 | 2/2004 |
| JP | 2004-037478 A | 2/2004 |
| JP | 3820137 B2 | 9/2006 |

OTHER PUBLICATIONS

International Search Report for PCT/JP2012/057960, date of mailing Jul. 3, 2012.
Chinese Office Action issued for corresponding application CN 201280004401.3, dated Sep. 28, 2014 (English translation attached).
Supplementary European Search Report dated Jan. 28, 2015, issued for EP 12 771 382.4.

* cited by examiner

*Primary Examiner* — Aaron Austin
*Assistant Examiner* — Lawrence Ferguson
(74) *Attorney, Agent, or Firm* — Arent Fox LLP

(57) ABSTRACT

In a molding die for multicolored molding, a second fixed die includes a hollow shape portion which is arranged at a portion associated with an optical functional surface. The second fixed die further includes an abutting portion which abuts on the optical element excluding the optical functional surface.

16 Claims, 14 Drawing Sheets

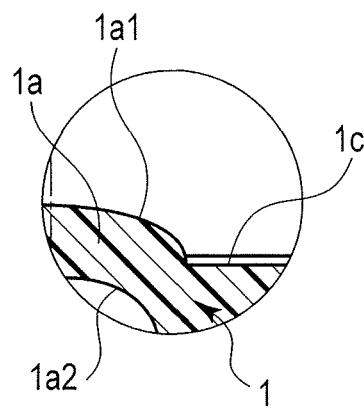
F I G. 3
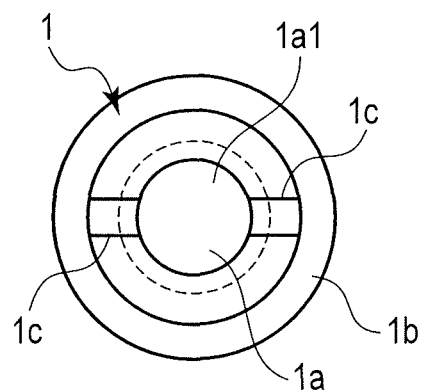
F I G. 4

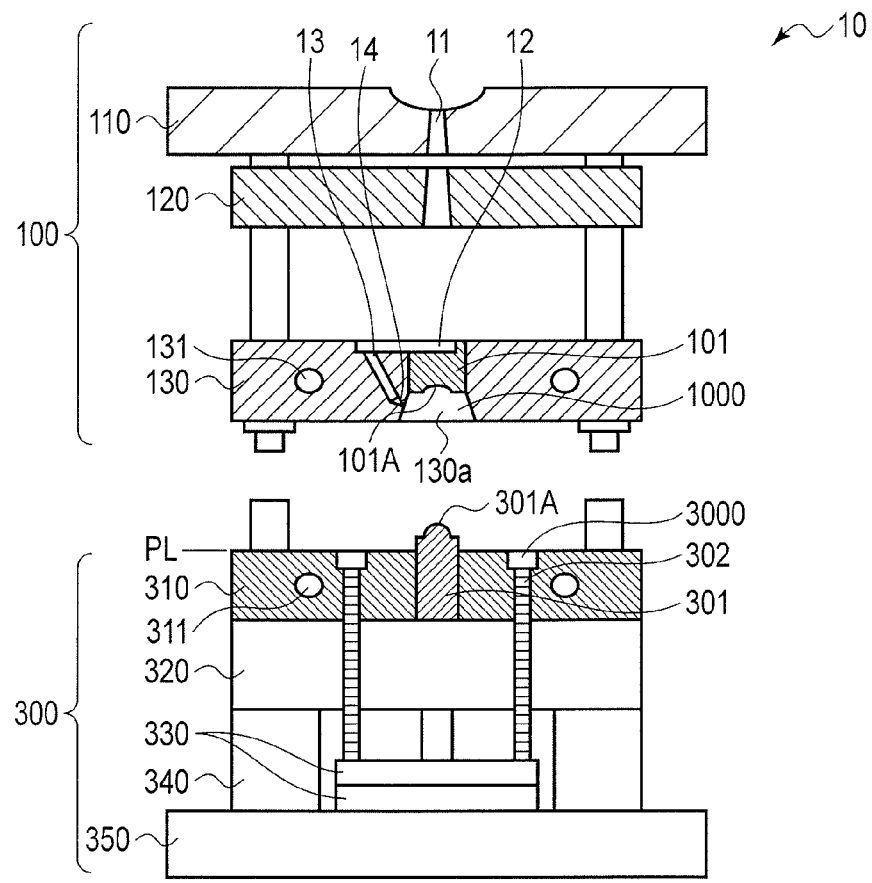
F I G. 6
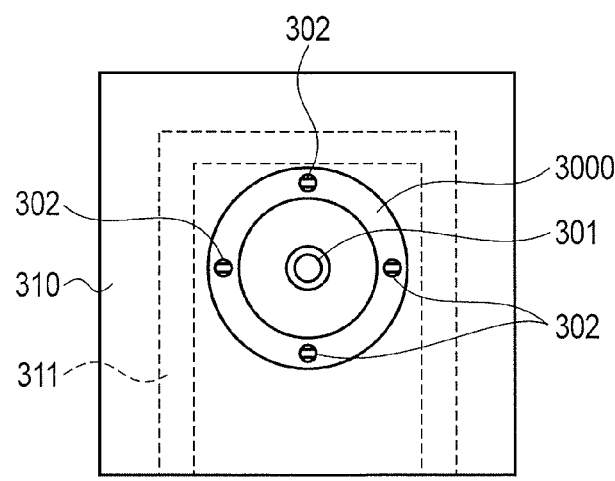
F I G. 7

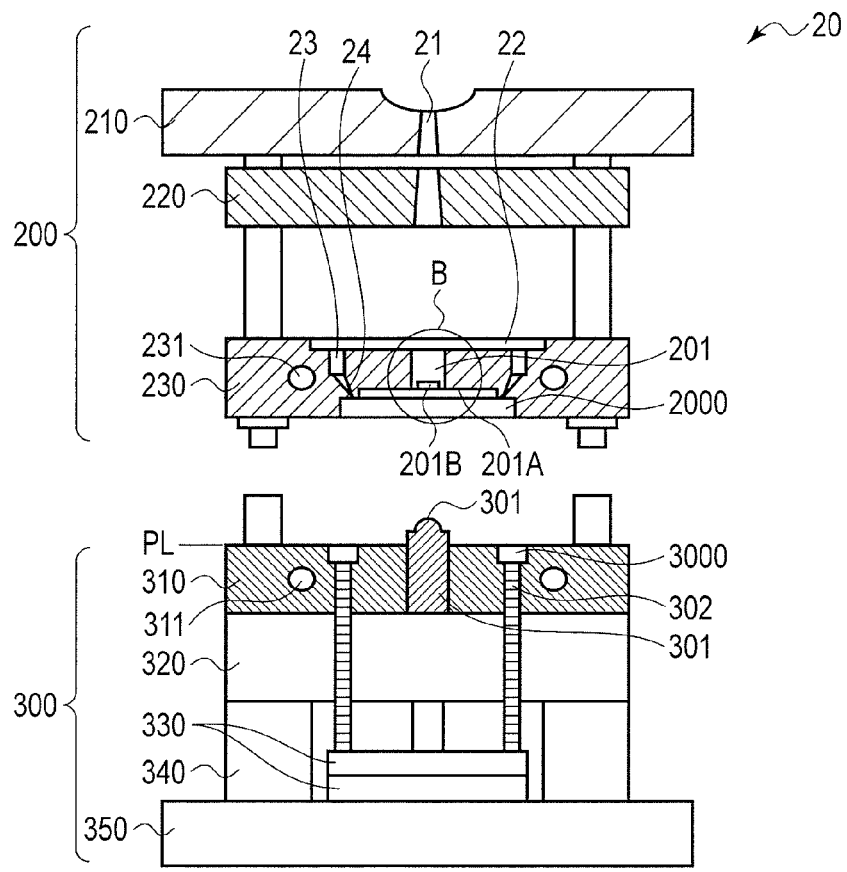
F I G. 10
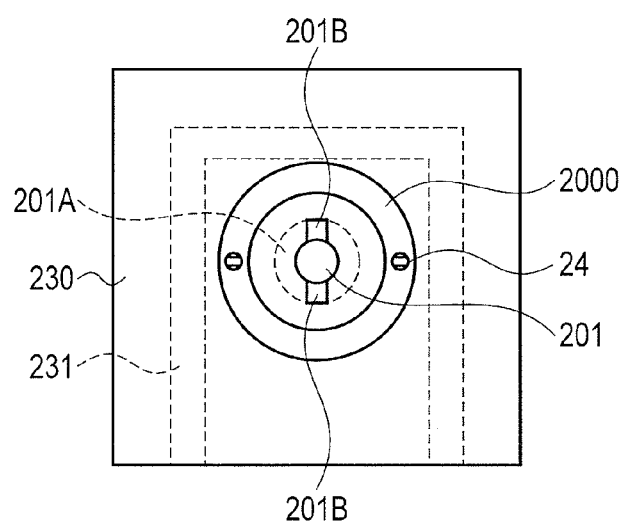
F I G. 11

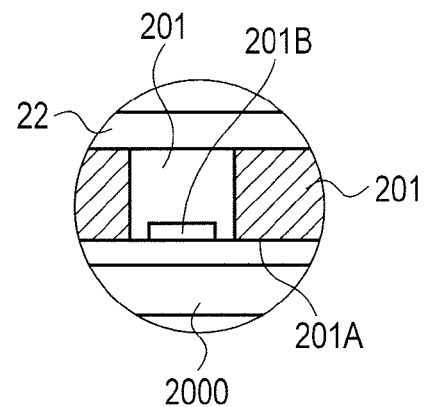
F I G. 12
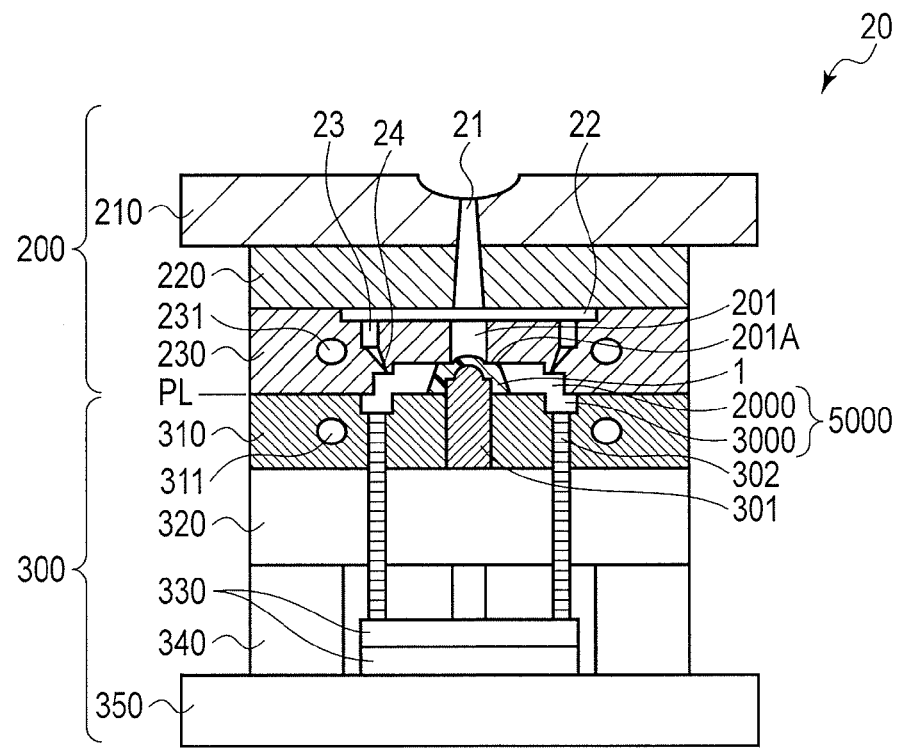
F I G. 13

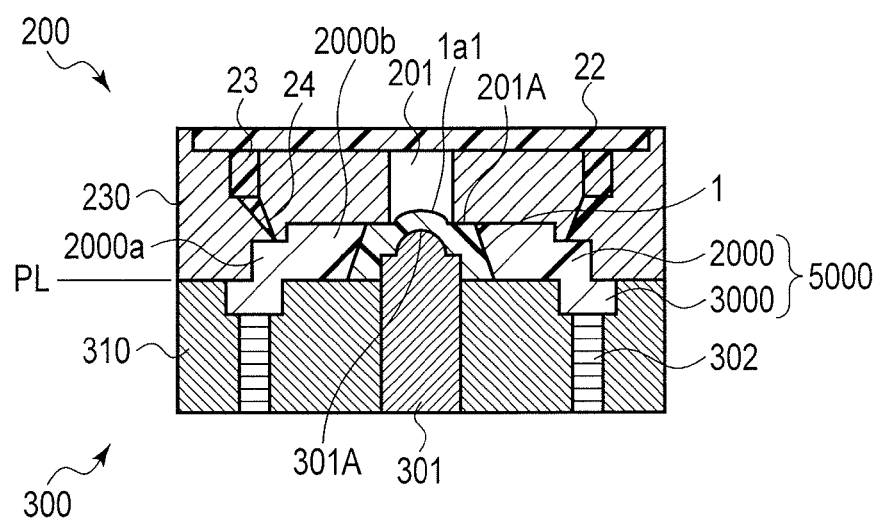
F I G. 14

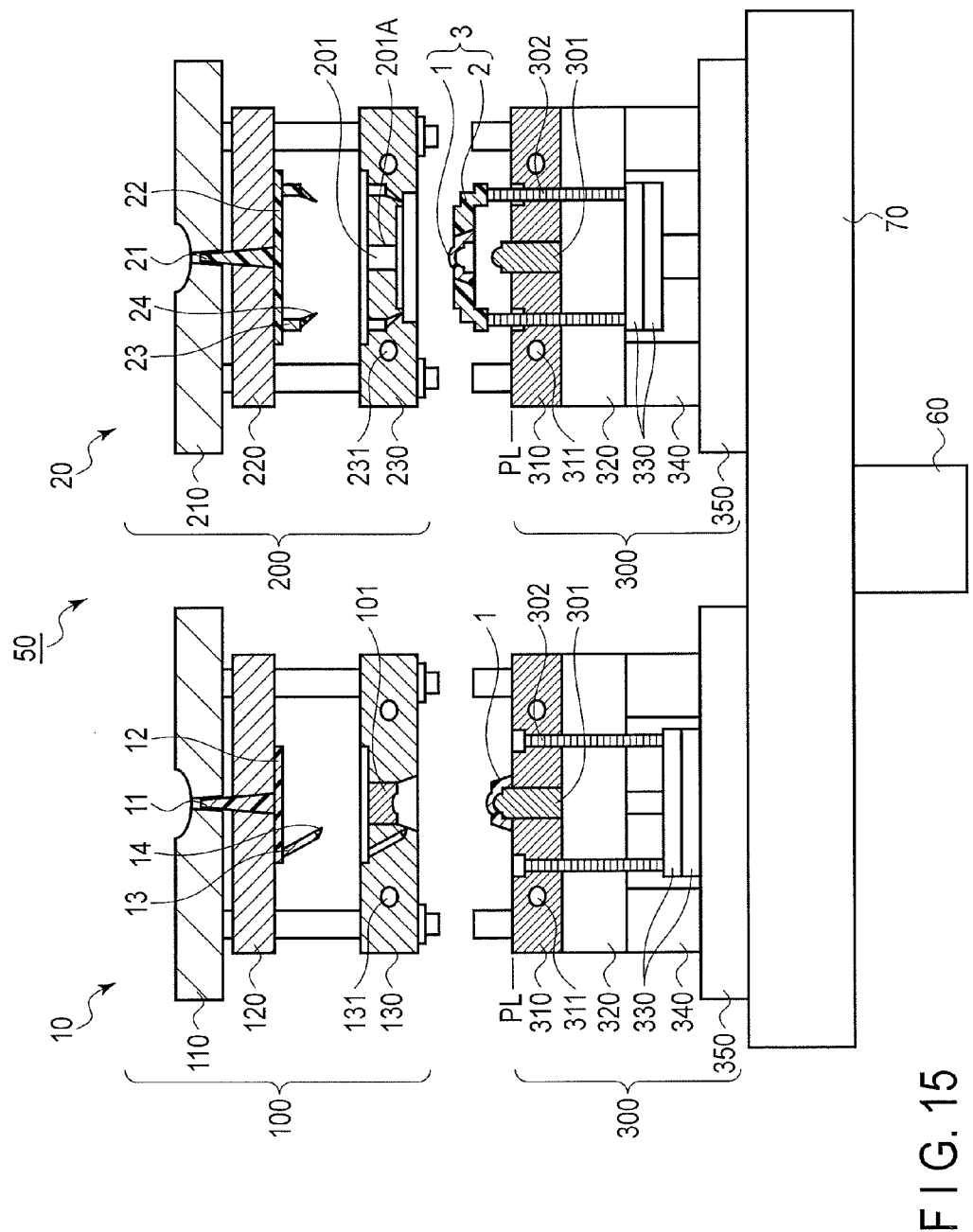
F I G. 15

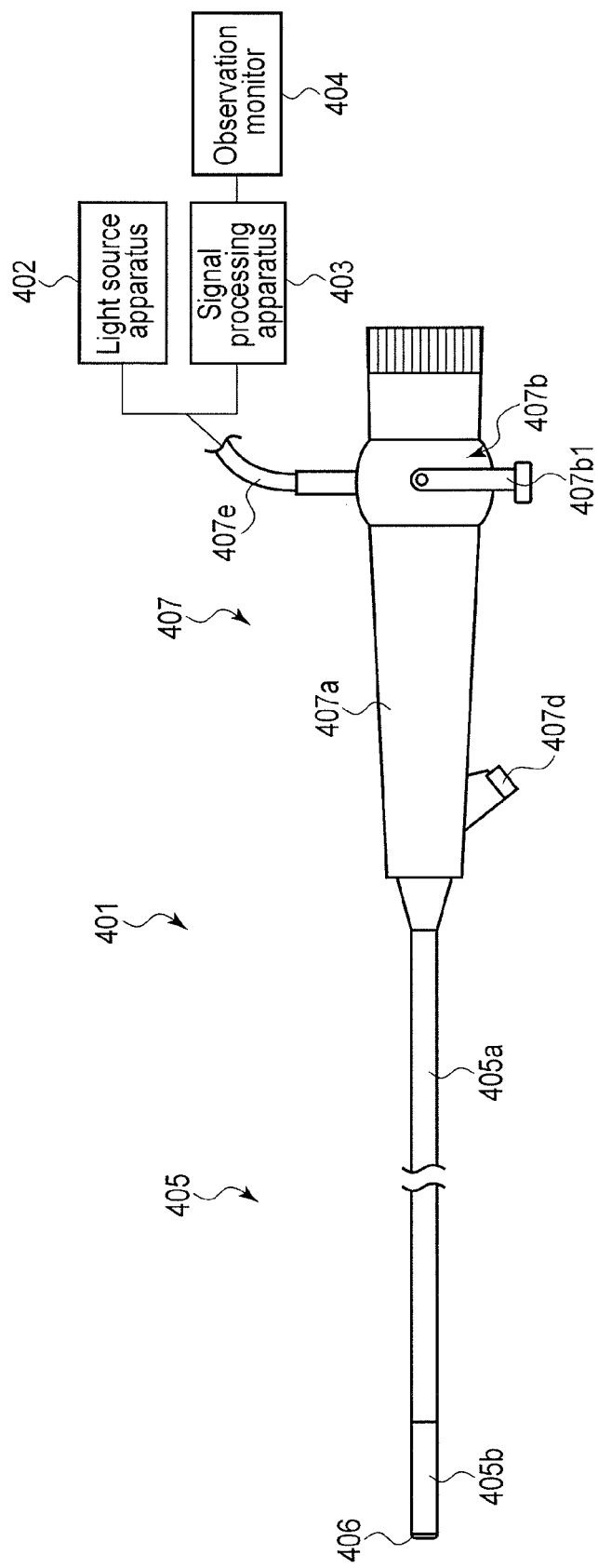
F I G. 16

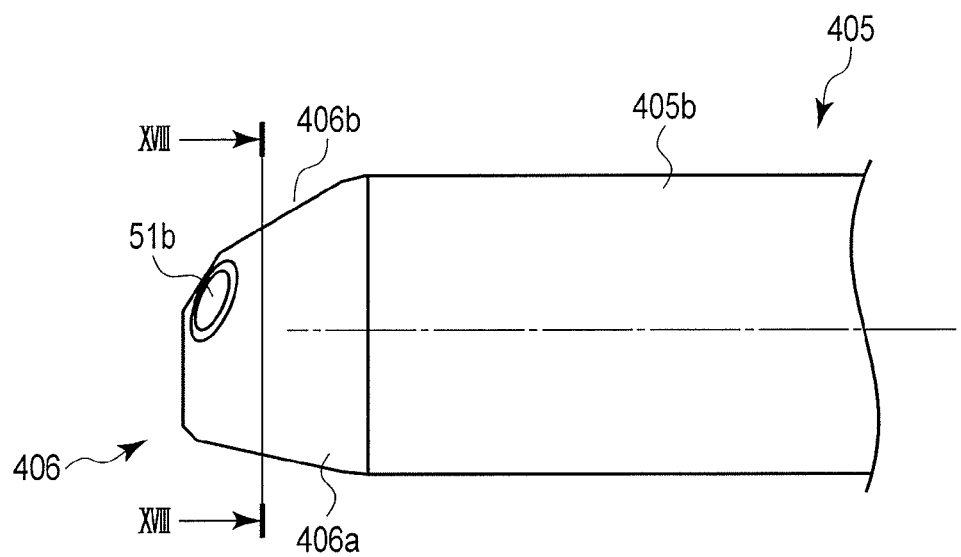
F I G. 17
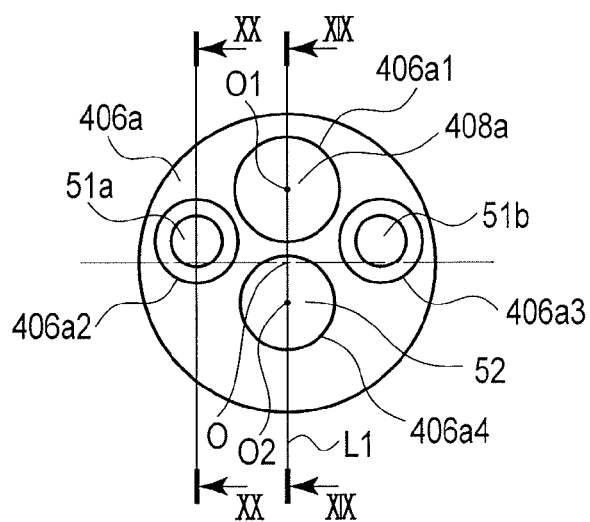
F I G. 18

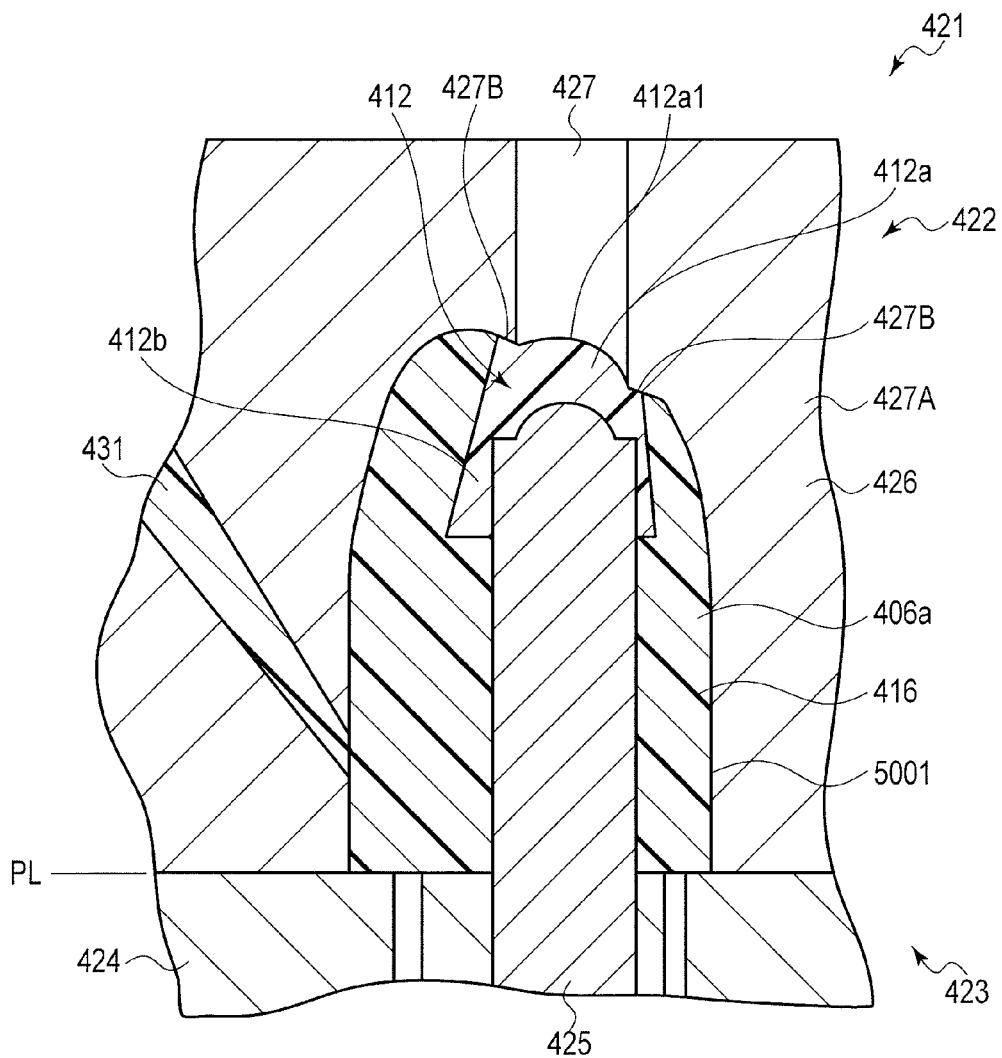
F I G. 21

MOLDING DIE FOR MULTICOLORED MOLDING, MOLDING METHOD OF MULTICOLORED MOLDED PIECE, AND MULTICOLORED MOLDED PIECE

CROSS REFERENCE TO RELATED APPLICATIONS

This application is a Continuation application of PCT Application No. PCT/JP2012/057960, filed Mar. 27, 2012 and based upon and claiming the benefit of priority from prior Japanese Patent Application No. 2011-087620, filed Apr. 11, 2011, the entire contents of all of which are incorporated herein by reference.

BACKGROUND OF THE INVENTION

1. Field of the Invention

The present invention relates to a molding die for multicolored molding that combines and integrates different resins, a molding method of a multicolored molded piece, and a multicolored molded piece.

2. Description of the Related Art

In general, double molding represents the following technology. Two different types of resin materials are used, an optical element and its adjacent member such as a frame member of the optical element are molded, and the optical element and the adjacent member are integrated. For example, Japanese Patent No. 3820137 discloses an example of this double molding. In Japanese Patent No. 3820137, a primary molding die used for performing primary molding with respect to the optical member and a secondary molding die for performing secondary molding with respect to the adjacent member are arranged. It should be noted that a movable die for the primary molding and a movable die for the secondary molding are used in common. Further, the optical member is primary molded in a cavity configured between a first fixed die and the movable die for the primary molding. Then, the first fixed die and the movable die are opened. At this time, an optical functional surface of the optical element remains being fitted in the movable die, and the optical element is held in the movable die. Then, in the secondary molding, the movable die holding this optical element is combined with a second fixed die for the secondary molding. Furthermore, the adjacent member is subjected to the secondary molding between the second fixed die and the movable die for the secondary molding. As described above, Japanese Patent No. 3820137 discloses the method for obtaining a double-molded piece of the optical element and the adjacent member.

Moreover, Jpn. Pat. Appln. KOKAI Publication No. 2004-1424 discloses the following contents. A first molded portion is molded in primary molding. In secondary molding, a secondary molding cavity is constituted of a first molded portion and a secondary molding die member. The secondary molding cavity is filled with a secondary molding molten resin. At this time, a surface of the first molded portion is molten by heat of the molten resin. Additionally, at the time of molding a double-molded piece, joining interface portions of the first molded portion and the secondary molding die member are bonded to each other.

BRIEF SUMMARY OF THE INVENTION

An embodiment of molding die for multicolored molding according to the present invention includes a first molding die which defines a first cavity, which is configured to mold a primary molded portion as an optical element that is made of a first resin and has at least an optical functional surface, between a first fixed die having a first fixed side runner through which the first resin flows and a movable die that is connectable to and separable from the first fixed die; and a second molding die which defines a second cavity, which is configured to mold a secondary molded portion by using a second resin different from the first resin, while being joined to the optical element molded by the first molding die, wherein the second molding die has a second fixed die which is connectable to and separable from the movable die, the molding die for multicolored molding mold a multicolored molded piece by defining the second cavity between the movable die and the second fixed die, and the second fixed die comprises a hollow shape portion which is arranged at a portion associated with the optical functional surface and an abutting portion which abuts on the optical element excluding the optical functional surface.

An embodiment of molding method of a multicolored molded piece according to the present invention includes a primary molding step of performing primary molding of a primary molded portion as an optical element having an optical functional surface in a first cavity defined between a movable die and a first fixed die; a movable die movement step of moving the optical element from the first cavity to a second cavity, which is defined between the movable die and a hollow-shaped second fixed die abutting on the optical element excluding the optical functional surface, in accordance with movement of the movable die; and a secondary molding step of performing secondary molding of a secondary molded portion in the second cavity, and integrating the secondary molded portion with the optical element after the movement.

An embodiment of the present invention is provides a multicolored molded piece molded by using above molding method.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is an enlarged longitudinal cross-sectional view showing a portion A in FIG. 2.

FIG. 4 is a top view showing an optical element which is a primary molded portion according to the first embodiment.

FIG. 6 is a longitudinal cross-sectional view showing a state that the primary molding die of the injection molding die has been moved to a mold opening position according to the first embodiment.

FIG. 7 is a plan view of a movable die of the primary molding die of the injection molding die according to the first embodiment.

FIG. 10 is a longitudinal cross-sectional view showing a state that a secondary molding die of the injection molding die has been moved to the die opening position according to the first embodiment.

FIG. 11 is a plan view of a movable die of the secondary molding die of the injection molding die according to the first embodiment.

FIG. 12 is an enlarged longitudinal cross-sectional view of a portion B in FIG. 10.

FIG. 13 is a longitudinal cross-sectional view showing a state that the secondary molding die of the injection molding has been moved to the die closing position according to the first embodiment.

FIG. 14 is a longitudinal cross-sectional view showing an enlarged second cavity of the secondary molding die according to the first embodiment.

FIG. 15 is a longitudinal cross-sectional view showing a die opening state of the entire double molding die after completion of molding according to the first embodiment.

FIG. 16 is a side elevation showing a configuration of an entire endoscope according to a second embodiment of the present invention.

FIG. 17 is a front view showing a distal end portion of the endoscope according to the second embodiment.

FIG. 18 is a cross-sectional view taken along line XVIII-XVIII in FIG. 17.

FIG. 21 is a longitudinal cross-sectional view showing an enlarged second cavity of a secondary molding die for the distal end portion of the endoscope according to the second embodiment.

DETAILED DESCRIPTION OF THE INVENTION

First Embodiment (Configuration)

Figure 1:
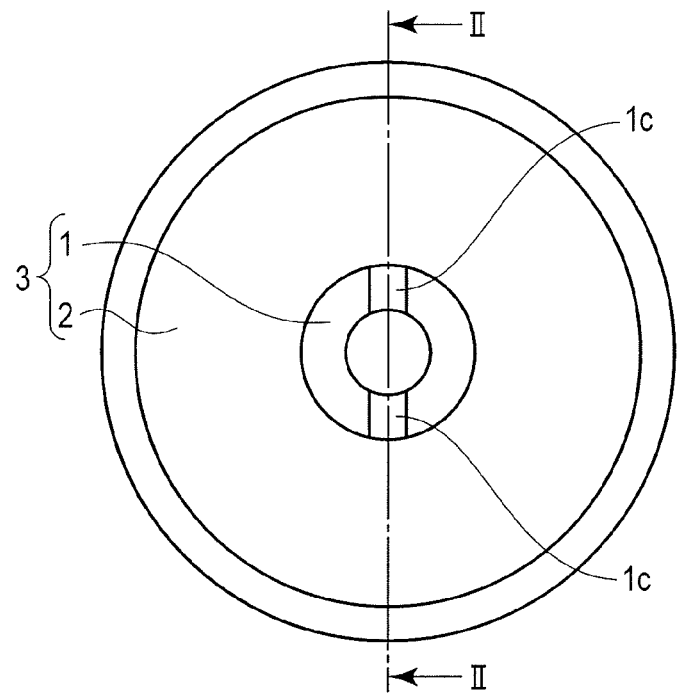
FIG. 1 is a top view of a double-molded piece which is a secondary molded portion according to a first embodiment of the present invention.
Figure 2:
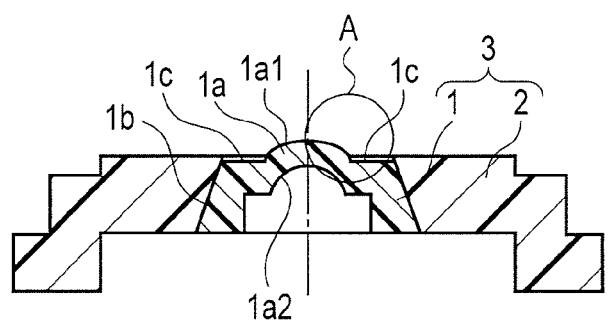
FIG. 2 is a cross-sectional view taken along line II-II in FIG. 1.
Figure 5:
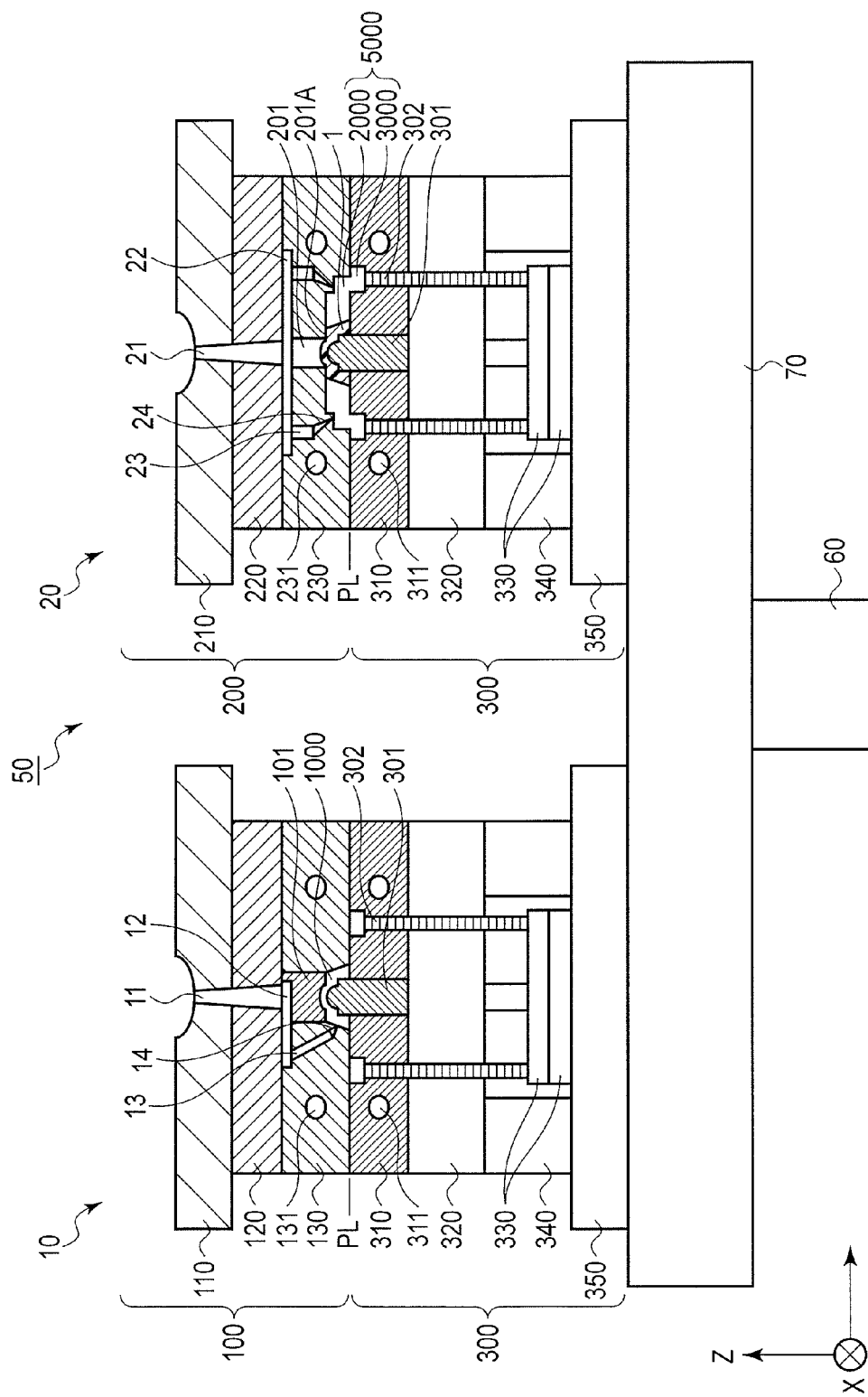
FIG. 5 is a longitudinal cross-sectional view of an entire double molding die showing a state that an injection molding die has been moved to a mold closing position according to the first embodiment.

FIG. 1 to FIG. 15 shows a first embodiment of the present invention. FIG. 1 is a top view of a multicolored molded piece, for example, a double-molded piece 3 which is a resin molded piece according to this embodiment. FIG. 2 is a cross-sectional view taken along line II-II in FIG. 1. Further, FIG. 5 is a cross-sectional view of an entire double molding die (a molding die) 50 for molding the double-molded piece 3.

As shown in FIG. 1 and FIG. 2, the double-molded piece 3 according to this embodiment is formed by integrating an optical element 1 and a cylindrical adjacent member 2 by double molding. The optical element 1 and an adjacent member 2 are an integrated matter. The optical element 1 is, for example, an optical lens and a primary molded portion. The adjacent member 2 is a secondary molded portion which holds the optical element 1. The optical element 1 is, for example, a lens having a convex shape and a concave shape. This optical element 1 is made of a transparent resin material through which light can be transmitted. This resin material is a first resin (a first molding resin). This resin material is, for example, polycarbonate (PC) and has meltability. The adjacent member 2 is arranged to be adjacent to the optical element 1. The adjacent member 2 is made of a second resin (a second molding resin) different from the first resin. The adjacent member 2 is formed by using the second resin for injection molding. In this embodiment, the second resin is made by coloring, for example, polycarbonate (PC) into an opaque color.

As shown in FIG. 2, the optical element 1 has an optical element main body 1a that has two surfaces (an outer surface and an inner surface) facing each other; and a cylindrical cylinder wall portion 1b coupled with an outer peripheral region of this optical element main body 1a. The outer surface of the optical element main body 1a has a convex optical functional surface 1a1 having a convex curved shape. The inner surface of the optical element main body 1a has a concave optical functional surface 1a2 having a concave curved shape. The adjacent member 2 is a lens frame used for positioning when the double-molded piece 3 is assembled to a non-illustrated component. This non-illustrated component has, for example, an observation optical system of an endoscope or an imaging optical system of a camera. The adjacent member 2 is, for example, an imaging lens unit. In this case, the adjacent member 2 has a configuration that a lens obtained by other means is assembled to an inside portion of the adjacent member 2.

In this embodiment, the double-molded piece 3 is subjected to double molding by a later-described double molding die 50 shown in FIG. 5. At this time, as shown in FIG. 1, FIG. 2, FIG. 3, and FIG. 4, an air vent transfer shape 1c is formed on an outer surface of the optical element 1 excluding the optical functional surface 1a1 at the time of secondary molding. This air vent transfer shape 1c is molded when a portion excluding the optical functional surfaces 1a1 and 1a2 is pressed and held by a later-described secondary molding die 20.

A configuration of the double molding die 50 will now be described with reference to FIG. 5. The double molding die 50 according to this embodiment has a primary molding die (a first molding die) 10 and a secondary molding die (a second molding die) 20. The primary molding die 10 and the secondary molding die 20 are arranged on a movable platen 70 of a later-described injection molding machine.

The primary molding die 10 has a first fixed die 100 and a movable die 300. The first fixed die 100 and the movable die 300 are arranged to face each other to sandwich a parting line (PL) therebetween. The movable die 300 is arranged to be movable in a mold opening/closing direction with respect to the first fixed die 100. The mold opening/closing direction represents an up/down (Z) direction in FIG. 5. That is, the movable die 300 can be connected to or separated from the first fixed die 100. Further, the secondary molding die 20 has a second fixed die 200 and a movable die 300. The second fixed die 200 and the movable die 300 are arranged to face each other to sandwich the PL therebetween. The movable die 300 is arranged to be movable in the mold opening/closing direction with respect to the second fixed die 200. That is, the movable die 300 can be connected to or separated from the second fixed die 200.

In the primary molding die 10 and the secondary molding die 20, a configuration of the fixed die on the primary side is different from that on the secondary side, and a configuration of the movable die on the primary side is the same as that on the secondary side. Therefore, a name of a constituent component of the movable die is not changed depending on the primary process and the secondary process, and it will be referred to as the movable die 300 hereinafter.

At the time of molding the double-molded piece 3, the primary molding die 10 performs primary molding with respect to the optical element 1 which is a primary molded portion. Then, the secondary molding die 20 performs secondary molding with respect to the adjacent member 2. The optical element 1 and the adjacent member 2 are integrated simultaneously with the secondary molding of the adjacent member 2. As a result, the double-molded piece 3 is formed.

As shown in FIG. 6, the first fixed die 100 has a primary fixed side mounting plate 110, a primary fixed side fall plate 120, and a primary fixed side die plate 130. A primary fixed insert 101 is fitted and inserted in a central part of the primary fixed sided die plate 130.

As shown in FIG. 6, the movable die 300 has a movable side die plate 310, a movable side receiving plate 320, a spacer block 340, and a movable side mounting plate 350. An ejector plate 330 constituting a protrusion mechanism is arranged on the inner side of the spacer block 340. Four ejector pins 302 are disposed to this ejector plate 330 (see FIG. 7). A movable insert 301 is fitted and inserted in a central part of the movable side die plate 310. That is, the movable insert 301 is inserted in the movable die 300. The movable insert 301 is arranged to face the primary fixed insert 101 at an interval along the Z-axis direction when the first fixed die 100 of the primary molding die 10 and the movable die 300 of the primary molding die 10 are closed (see FIG. 8). That is, the movable insert 301 is arranged to face and to be separated from the primary fixed insert 101.

As shown in FIG. 10, the second fixed die 200 has a secondary fixed side mounting plate 210, a secondary fixed side fall plate 220, and a secondary fixed side die plate 230. As shown in FIG. 10 and FIG. 11, the secondary fixed side die plate 230 has a hollow secondary fixed space 201 arranged at a portion associated with the movable insert 301 of the movable side die plate 310, which is specifically the convex optical functional surface 1a1, and a secondary fixed pressing and holding portion 201A which is arranged at the outer periphery of the secondary fixed space 201 and abuts on the optical element 1 excluding the convex optical functional surface 1a1. The movable die 300 facing this second fixed die 200 has the same configuration as the movable die 300 facing the first fixed die 100 as described above.

As shown in FIG. 5, the movable side mounting plate 350 of the primary molding die 10 and the movable side mounting plate 350 of the secondary molding die 20 are fixed on the movable platen 70 of the same injection molding machine. This movable platen 70 is movable in the Z-direction. The movable plate 70 can rotate on a rotary shaft 60. The rotary shaft 60 is arranged at a center position of the movable platen 70 to be parallel to the Z-direction. Furthermore, although not shown, the primary fixed side mounting plate 110 of the primary molding die 10 and the secondary fixed side mounting plate 210 of the secondary molding die 20 are fixed to a fixed side platen of the injection molding machine.

Figure 9:
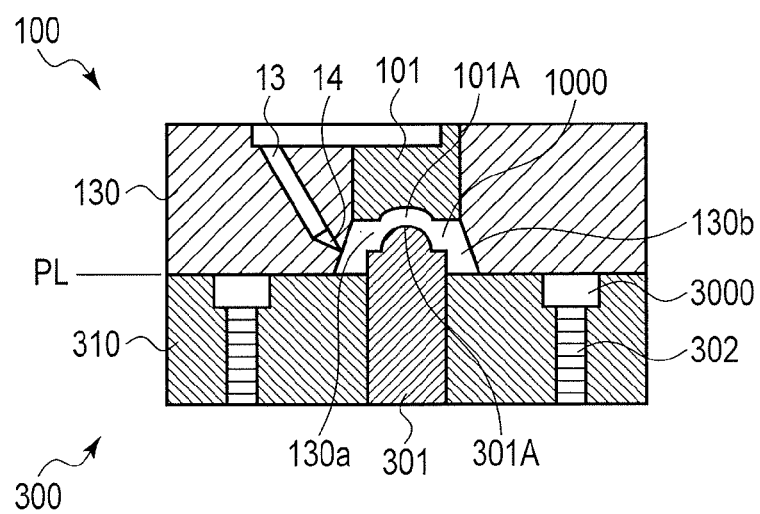
FIG. 9 is a longitudinal cross-sectional view showing an enlarged first cavity of the primary molding die according to the first embodiment.

A detailed configuration of the primary molding die 10 will now be described. FIG. 6 shows a state that the primary molding die 10 is opened. As shown in FIG. 6, the primary fixed side die plate 130 of the primary molding die 10 has a concave portion 130a formed at a substantially central part of a lower surface of the primary fixed side die plate 130. As shown in FIG. 9, an end face of this concave portion 130a is formed of a lower surface of the primary fixed insert 101. A primary fixed side molding surface 101A having a concave curved shape is formed on the lower surface of this primary fixed insert 101. The convex optical functional surface 1a1 having the convex curved shape shown in FIG. 2 is molded by using this primary fixed side molding surface 101A having the concave curved shape. Moreover, as shown in FIG. 9, a molding surface 130b configured to form an outer surface shape of the cylinder wall portion 1b depicted in FIG. 2 is formed on the primary fixed side die plate 130.

As shown in FIG. 9, a movable side molding surface 301A having a convex curved shape is formed on the movable insert 301 facing the primary fixed side die plate 130. The movable side molding surface 301A is arranged to be separated from and face the primary fixed side molding surface 101A. The concave optical functional surface 1a2 having the concave curved shape shown in FIG. 2 is molded by using this movable side molding surface 301A.

Additionally, at the time of mold closing of the first fixed die 100 of the primary molding die 10 and the movable die 300 of the primary molding die 10 (see FIG. 8 and FIG. 9), a first cavity 1000 is constituted between the first fixed die 100 and the movable die 300. That is, the primary molding die 10 defines the first cavity 1000 configured to mold the optical element 1. The first cavity 1000 is a primary molding cavity required for molding the optical element 1 which is the primary molded portion. The first cavity 1000 is formed to include the primary fixed side molding surface 101A, the molding surface 130b, and the movable side molding surface 301A. In detail, the first cavity 1000 represents a space portion surrounded by the primary fixed insert 101, the primary fixed side die plate 130, the movable insert 301, and the movable side die plate 310. Further, at the time of molding the optical element 1 which is the primary molded portion, the convex optical functional surface 1a1 and the concave optical functional surface 1a2 of the optical element 1 shown in FIG. 2 are formed with use of the primary fixed side molding surface 101A and the movable side molding surface 301A. At the same time, the outer surface of the cylinder wall portion 1b of the optical element 1 shown in FIG. 2 is formed by using the molding surface 130b. In this manner, the molding surface 130b forms the outer surface shape of the optical element 1 in the first fixed die 100.

Figure 8:
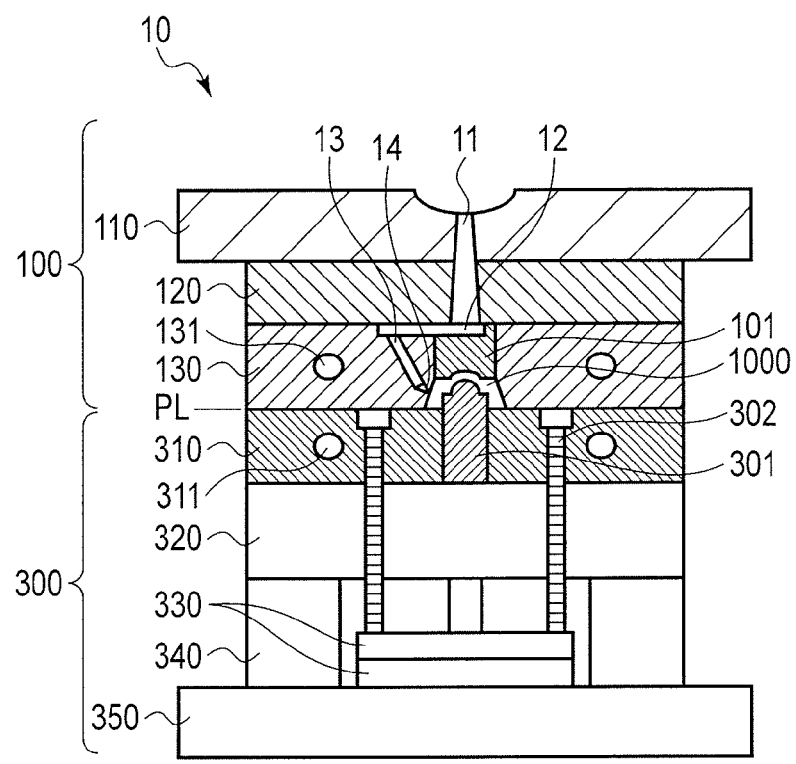
FIG. 8 is a longitudinal cross-sectional view showing a state that the primary molding die of the injection molding die has been moved to the die closing position according to the first embodiment.

Furthermore, as shown in FIG. 8, the primary fixed side mounting plate 110 and the primary fixed side fall plate 120 have a primary molding primary sprue 11. The primary molding primary sprue 11 is arranged at the center of the primary fixed side mounting plate 110 and the center of the primary fixed side fall plate 120. A resin material that molds the optical element 1 is supplied through the primary molding primary sprue 11 along the Z-direction. Moreover, the primary fixed side die plate 130 has a primary molding runner 12 that communicates with the primary molding primary sprue 11, a primary molding secondary sprue 13 that communicates with the primary molding runner 12, and a primary molding pinpoint gate 14 which communicates with the primary molding secondary sprue 13 and through which the resin is supplied to the first cavity 1000 to fill the first cavity 1000 with the resin (see FIG. 6 and FIG. 8).

Additionally, at the time of molding the optical element 1, the resin material having meltability fills the first cavity 1000 from the primary molding primary sprue 11 through the primary molding runner 12, the primary molding secondary sprue 13, and the primary molding pinpoint gate 14.

Further, as shown in FIG. 6, the primary fixed side die plate 130 has a primary fixed side temperature control tube 131. A temperature-controlled medium such as water or oil constantly flows through this primary fixed side temperature control tube 131 at the time of primary molding. This medium prevents the resin material from being solidified.

A movable side space 3000 which is a ring-shaped concave portion is formed in the movable side die plate 310. The movable side space 3000 is arranged on the outer peripheral portion side of the movable insert 301 and also on the side facing the PL. Further, the movable side space 3000 is arranged with the central axis of the primary molding die 10 at the center. The movable side space 3000 surrounds the movable insert 301. As shown in FIG. 5, the movable side space 3000 forms part of a second cavity 5000. The second cavity 5000 is a secondary molding cavity for the adjacent member 2 of the double-molded piece 3. Furthermore, four ejector pins 302 are arranged to abut on a bottom surface of this movable side space 3000 (see FIG. 6 and FIG. 7).

A detailed configuration of the secondary molding die 20 will now be described. FIG. 10 shows a state that the secondary molding die 20 is opened. As shown in FIG. 10, the secondary fixed side die plate 230 of the second fixed die 200 has a secondary fixed side space 2000 formed at a substantially central part of a lower surface of the secondary fixed side die plate 230. The secondary fixed side space 2000 forms part of the second cavity 5000 configured to mold the adjacent member 2. This secondary fixed side space 2000 is arranged with the central axis of the secondary molding die 20 at the center and has a circular concave portion. Furthermore, as shown in FIG. 14, the secondary fixed side space 2000 includes a large-diameter first circular concave portion 2000$a$ arranged on the lower surface side of the secondary fixed side die plate 230 and a second circular concave portion 2000$b$ which is arranged on the upper side of this first circular concave portion 2000$a$ and has a diameter smaller than the first circular concave portion 2000$a$.

Moreover, the secondary fixed side die plate 230 has the hollow secondary fixed space 201 arranged at the portion associated with the convex optical functional surface 1$a$1 of the optical element 1. Additionally, the secondary fixed pressing and holding portion 201A abuts on the optical element 1 excluding the convex optical functional surface 1$a$1.

Further, as shown in FIG. 11 and FIG. 12, the secondary fixed pressing and holding portion 201A has two air vents 201B. Each air vent portion 201B is a gap which enables an air trap portion that is arranged at a boundary portion of the optical element 1 and the secondary fixed space 201 and made of a second resin to communicate with the hollow secondary fixed space 201, and into which the second the second resin cannot penetrate. The air vent 201B is formed as a groove portion having an air venting or gas venting structure configured to discharge air remaining in the second cavity 5000 or a gas generated from a raw material when the molten resin is injected into the second cavity 5000.

As shown in FIG. 11, the two air vents 201B according to this embodiment are formed as linear groove portions. Each air vent 201B is formed on a bottom portion in the second circular concave portion 2000$b$ in the secondary fixed pressing and holding portion 201A and also extended in a radial direction of the second circular concave portion 2000$b$. As shown in FIG. 11, an inner end portion of each air vent 201B is coupled with the secondary fixed space 201, and an outer end portion of each air vent 201B is coupled with a corner portion of an outer peripheral edge of the second circular concave portion 2000$b$. Moreover, each of the air vents 201B has a gap of a size that prevents the resin filling the second cavity 5000 from flowing (penetrating), and it is formed with a size having, for example, a width of approximately 1 mm and a depth of approximately 0.02 mm. It should be noted that the size of the air vent 201B actually affects attained viscosity of the molding resin, a volatile substance of the material, and others, and hence this size is appropriately selectively set in accordance with the volume of a molded piece, the type of resin such as molding resin flow length, and others.

Further, as shown in FIG. 10, the secondary fixed side mounting plate 210 and the secondary fixed side fall plate 220 of the secondary molding die 20 have a secondary molding primary sprue 21. The secondary molding primary sprue 21 is arranged at the center of the secondary fixed side mounting plate 210 and the center of the secondary fixed side fall plate 220. A resin material that molds the adjacent member 2 is supplied through the secondary molding primary sprue 21 along the Z-direction. Furthermore, the secondary fixed side die plate 230 has one secondary molding runner 22 communicating with the secondary molding primary sprue 21, two secondary molding secondary sprues 23 communicating with the secondary molding runner 22, and two secondary molding pinpoint gates 24 which communicate with the secondary molding secondary sprues 23 and through which the resin is supplied to the second cavity 5000 to fill the second cavity 5000 with the resin. The second cavity 5000 is formed of the secondary fixed side space 2000 and the movable side space 3000. That is, the secondary molding die 20 defines the second cavity 5000 configured to mold the adjacent member 2 with use of the second resin different from the first resin. Here, the two secondary molding secondary sprues 23 and the two secondary molding pinpoint gates 24 shown in FIG. 11 are arranged on both sides of the secondary fixed space 201. As shown in FIG. 11, a line connecting the centers of the two secondary molding pinpoint gates 24 is arranged to be substantially orthogonal to a line connecting the center lines of the two air vents 201B. It should be noted that the number of air vents 201B is not necessarily restricted to 2, and it may be 1 or more. It is preferable to provide the air vents 201B in accordance with the number of the secondary molding pinpoint gates 24.

At the time of mold closing of the second fixed die 200 and the movable die 300 of the secondary molding die 20, as shown in FIG. 13, the optical element 1 which is the primary molded portion is set between the second fixed die 200 and the movable die 300 in advance. At this time, the optical element 1 is held while being fitted on the movable insert 301 of the movable die 300 of the primary molding die 10. Further, as shown in FIG. 5 and FIG. 13, the second cavity 5000 which is the secondary molding cavity is formed between the second fixed die 200 and the movable die 300. At this time, the second cavity 5000 is formed when the secondary fixed side space 2000 of the second fixed die 200 and the movable side space 3000 of the movable die 300 communicate with each other while being arranged to face to sandwich the PL therebetween. In this state, as shown in FIG. 14, the second cavity 5000 is filled with the second resin. As a result, the adjacent member 2 is joined to the periphery of the optical element 1 which is the primary molded portion, thereby molding the double-molded piece 3.

A manufacturing method of the double-molded piece 3 will now be described.

At the time of manufacturing the double-molded piece 3 which is a resin molded piece according to this embodiment, the double molding die 50 shown in FIG. 5 is used. With this double molding die 50, the optical element 1 which is the primary molded piece is primary-molded by using the primary molding die 10, and the adjacent member 2 which is the secondary molded portion is secondary-molded by using the secondary molding die 20 at the same time.

[Primary Molding Step]

At the time of molding the optical element 1 with use of the primary molding die 10, first, as shown in FIG. 5, the movable die 300 moves to get closer to the first fixed die 100 and the second fixed die 200, and mold closing is effected. At this time, in the primary molding die 10, the mold closing is carried out in a state that the first fixed die 100 and the movable die 300 are joined to each other as shown in FIG. 8. As a result, the first cavity 1000 is formed.

Then, the transparent molten resin is supplied from the primary molding primary sprue 11 to the primary molding runner 12 by a non-illustrated resin injection unit. Subsequently, the first resin is supplied from the primary molding runner 12 into the first cavity 1000 through the primary molding secondary sprue 13 and the primary molding pinpoint gate 14, thereby filling the first cavity 1000.

Then, the first resin filling the first cavity 1000 is maintained in a pressure keeping state with a predetermined pressure for a predetermined time. Subsequently, when the first resin is cooled, the optical element 1 as the primary molded portion can be obtained.

[Movement Step]

Thereafter, as shown in FIG. 15, the movable die 300 moves away from the first fixed die 100 and the second fixed die 200, and mold opening is carried out. At this time, as shown in FIG. 15, when the first resin is cooled and contracted, the optical element 1 is fitted and held on the movable insert 301 of the movable die 300. The optical element 1 is separated from the primary molding secondary sprue 13 at a position of the primary molding pinpoint gate 14 simultaneously with the mold opening.

Then, in a state that the optical element 1 is fitted and held on the movable insert 301, the movable platen 70 of the molding machine rotates 180° on the rotary shaft 60. Consequently, as shown in FIG. 5, in the secondary molding die 20, the movable die 300 having the optical element 1 which is the primary molded portion being fitted and held and the second fixed die 200 are arranged to face each other. At the same time, in the primary molding die 10, the movable die 300 having no optical element 1 which is the primary molded portion arranged therein and the first fixed die 100 are arranged to face each other. In this state, the double molding die 50 is closed.

At this time, as shown in FIG. 14, in the optical element 1 held by the movable insert 301, since the convex optical functional surface 1a1 is arranged in the secondary fixed space 201 of the second fixed die 200, the convex optical functional surface 1a1 does not come into contact with the second fixed die 200. Further, the outer surface of the optical element 1 excluding the convex optical functional surface 1a1 is appressed against the secondary fixed pressing and holding portion 201A.

[Secondary Molding Step]

Subsequently, as shown in FIG. 13, the second cavity 5000 is filled with the colored second resin. This second resin is maintained in a pressure keeping state with a predetermined pressure for a predetermined time. Then, when the second resin is cooled, the adjacent member 2 which is the secondary molded portion is obtained. At the same time, the optical element 1 which is the primary molded portion and the adjacent member 2 which is the secondary molded portion are integrated, and the double-molded piece 3 is thereby molded. It should be noted that, at the time of the secondary molding using this secondary molding die 20, the primary molding of the optical element 1 which is the primary molded portion is performed in the primary molding die 10 at the same time.

After the double-molded piece 3 is molded, as shown in FIG. 15, the movable die 300 of the secondary molding die 20 is opened. At this time, the double-molded piece 3 is separated from the secondary molding secondary sprues 23 at positions of the secondary molding pinpoint gates 24. Then, when the ejector pins 302 are protruded by a protrusion mechanism of the molding machine, the double-molded piece 3 held in the movable die 300 of the secondary molding die 20 is ejected.

It should be noted that, at the time of the mold opening of this secondary molding die 20, the mold opening is also performed in the primary molding die 10 at the same time, and the optical element 1 which is the primary molded portion is fitted and held on the movable insert 301 of the movable die 300 in a state that the optical element 1 has been molded in the movable die 300. Subsequently, the above-described series of primary molding process and secondary molding process are repeated.

(Operation)

The operation of the above-described configuration will now be described. When the double molding die 50 according to this embodiment is used, first, in this embodiment, the optical element 1 which is the primary molded portion is primary-molded with use of the transparent first resin. Then, when the transparent first resin is cooled and contracted, the optical element 1 which is the primary molded portion is held while being fitted on the movable insert 301 of the movable die 300.

Subsequently, the optical element 1 as the primary molded portion is demolded from the first fixed die 100 simultaneously with the mold opening of the primary molding die 10. Thereafter, at the time of the secondary molding using the secondary molding die 20, in a state that the optical element 1 is fitted and held on the movable insert 301, the optical element 1 excluding the convex optical functional surface 1a1 is pressed and held by the movable die 300 and the secondary fixed pressing and holding portion 201A of the second fixed die 200. At this time, since the secondary fixed space 201 is arranged at the position associated with the convex optical functional surface 1a1, the convex optical functional surface 1a1 does not come into contact with a wall surface of the second fixed die 200. In this state, the secondary molding of the double-molded piece 3 is carried out.

At the secondary molding step, air is generated at a boundary portion between the optical element 1 and the adjacent member 2. This air is discharged to the secondary fixed space 201 through the air vents 201B. That is, the air is discharged to the outside of the second cavity 5000. An air vent transfer shape 1c is molded on the outer surface of the optical element 1 that joins each air vent 201B excluding the convex optical functional surface 1a1 of the optical element 1.

(Effect)

Thus, the above-described configuration exercises the following effects. That is, in the double molding die 50 for the double-molded piece 3 according to this embodiment, the second fixed die 200 has the hollow secondary fixed space 201 at the position associated with the convex optical functional surface 1a1 of the optical element 1. Therefore, after the convex optical functional surface 1a1 of the optical element 1 is primary-molded, the convex optical functional surface 1a1 is no longer brought into contact with a wall surface of the second fixed die 200 by the secondary fixed space 201 at the time of the secondary molding of the double-molded piece 3. Thus, the double molding die 50 can prevent the convex optical functional surface 1a1 of the optical element 1 from being deformed due to unevenness in shape of the second fixed die 200 or the like. Therefore, the double-molded piece 3 comprising the highly precise optical element 1 can be obtained.

Further, at the time of the secondary molding of the adjacent member 2, when the second cavity 5000 is filled with the second resin, air is generated. This air is efficiently discharged from the second cavity 5000 through the two air vents 201B. Therefore, the double molding die 50 can prevent the air from staying at the boundary portion between the optical element 1 and the adjacent member 2 in the double-molded piece 3. Furthermore, the double molding piece 50 can prevent a recessed portion from being produced on the outer surface of a joining interface at the boundary portion. As a result, the highly precise double-molded piece 3 having no recessed portion which is produced due to insufficient filling of the secondary molding resin can be obtained.

It should be noted that each air vent 201B can be constituted so that it can discharge the air in the second cavity 5000. Therefore, in regard to the shape of each air vent 201B, fluidity (a filling state) of the second resin is taken into consideration, the air vent 201B can be adjusted to be configured at a flow terminal portion (a confluent position) alone or configured in the middle of a flow process. Moreover, when the primary fixed side molding surface 101A has the convex curved shape, the optical element 1 can have a function coping with the convex curved shape by the primary molding. As described above, the function can be appropriately changed. It should be noted that the present invention is not restricted to this method, and the method can be changed to an arbitrary method as required.

Second Embodiment (Configuration)

FIG. 16, FIG. 17, FIG. 18, FIG. 19, and FIG. 20 show a second embodiment according to the present invention. This embodiment is applied to molding of a distal end portion 406 of an endoscope 401. FIG. 16 shows a configuration of the entire endoscope 401 which is used for observing the inside of a body cavity, diagnosing the inside of a body cavity, or carrying out a procedure. The endoscope 401 has an elongated flexible insertion unit 405 that is inserted into a patient's body cavity. The insertion unit 405 is coupled with an operation unit 407 at a proximal end of the insertion unit 405.

The insertion unit 405 has an elongated flexible tube portion 405a, a bending portion 405b coupled with a distal end of this flexible tube portion 405a, and a hard distal end portion 406 coupled with a distal end of the bending portion 405b. The distal end portion 406 is arranged at a distal end of the insertion unit 405. The bending portion 405b is formed by, for example, arranging non-illustrated bending pieces in a line along a direction of a central axis (a longitudinal direction) of the insertion unit 405 and pivotally fitting the bending pieces by a shaft member so that the bending pieces adjacent to each other can revolve in an up/down direction. As a result, the bending portion 405b bends in two directions, i.e., upper and lower directions alone. The bending portion 405b may bend in not only the upper and lower directions but also left and right directions, i.e., four directions.

The operation unit 407 has a grasping portion 407a and a bending mechanism portion 407b. It should be noted that, if the endoscope 401 is a fiberscope using an image guide, the operation unit 407 has a non-illustrated eyepiece portion arranged at a terminal part of the operation unit 407. The bending mechanism portion 407b has a lever type bending operation knob 407b1. When the bending operation knob 407b1 of the operation unit 407 revolves, the bending portion 405b forcibly bends in the up/down direction alone. As a result, a direction of the distal end portion 406 varies. Furthermore, the grasping portion 407a has a channel mouthpiece 407d.

A side surface of the operation unit 407 is coupled with one end of a universal cord 407e. The other end of this universal cord 407e has a non-illustrated scope connector. The endoscope 401 is connected to a light source apparatus 402 and a signal processing apparatus 403 through this scope connector. The signal processing apparatus 403 is connected to an observation monitor 404.

Figure 19:
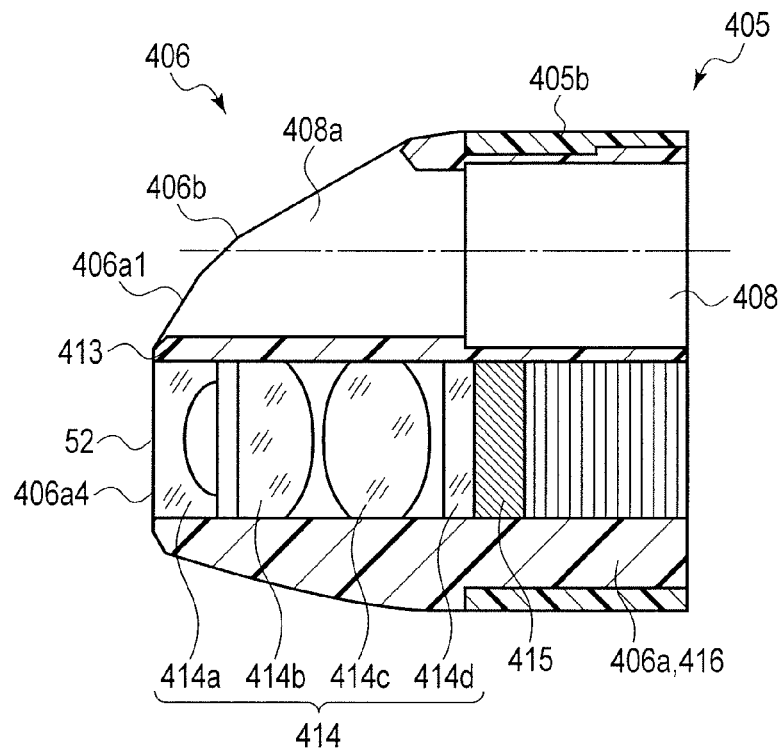
FIG. 19 is a cross-sectional view taken along line XIX-XIX in FIG. 18.

As shown in FIG. 17, FIG. 18, and FIG. 19, the distal end portion 406 has a distal end portion main body (a distal end constituent portion) 406a which is a single component. This distal end portion main body 406a is integrally molded with use of a resin. The resin which is a material forming the distal end portion main body 406a is made of an optically opaque material. In this case, the distal end portion main body 406a is made of, for example, a resin colored in black such as polysulfone (PSU).

As shown in FIG. 18, a distal end surface of the distal end portion main body 406a has two illumination window portions 51a and 51b from which illumination light exits, one observation window portion 52, and a distal end opening portion 408a of one surgical instrument insertion channel 408. In this embodiment, as shown in FIG. 18, the distal end opening portion 408a of the surgical instrument insertion channel 408 is arranged on the upper side of a center position O of the distal end surface of the distal end portion main body 406a, and the observation window portion 52 is arranged on the lower side of the same. Moreover, the two illumination window portions 51a and 51b are arranged at left and right symmetrical positions of a reference line L1 that connects a center line O1 of the distal end opening portion 408a to a center line O2 of the observation window portion 52, respectively.

Additionally, as shown in FIG. 17, an outer peripheral surface of the distal end portion main body 406a on an upper surface side (the distal end opening portion 408a side of the channel 408) is formed as an inclined surface 406b that tapers from the proximal end side toward the distal end side. As a result, the distal end surface of the distal end portion main body 406a has a surface that is long sideways and flat in the vertical direction. In detail, the distal end surface of the distal end portion main body 406a is formed as a spatulate portion with a substantially elliptical shape having a short axis in the up/down direction and a long axis in the left/right direction. The distal end portion main body 406a has a smooth surface which does not have a steep angle or extreme irregularities from the outer peripheral edge of the distal end surface to the outer peripheral edge of the proximal end portion of the distal end portion main body 406a. Specifically, the entire distal end surface of the distal end portion main body 406a is formed of a continuous curved surface from the edge of the substantially elliptical distal end surface to the substantially circular outer peripheral surface of a posterior proximal end portion of the distal end portion main body 406a. In other words, the outer peripheral surface of the distal end portion main body 406a is a smooth curved surface that changes from the substantially elliptical shape to the substantially circular shape in a section extending from the outer peripheral edge of the substantially elliptical distal end surface to the bending portion 405b having a substantially circular cross section that is set to be adjacent to a rear end of the distal end portion main body 406*a*.

As shown in FIG. 19, the inclined surface 406*b* on the upper surface side of the distal end portion main body 406*a* is arranged in a direction that the bending portion 405*b* bends, which is a direction along which the distal end portion 406 rises. A rounded edge is formed at the peripheral edge of the distal end surface of the distal end portion main body 406*a* or a corner portion exposed to the outside of the distal end portion main body 406*a*.

As shown in FIG. 18, the distal end portion main body 406*a* has four holes (406*a*1 to 406*a*4) that are arranged in the distal end portion main body 406*a* to be parallel to an axial direction of the insertion unit 405. The first hole 406*a*1 is a channel hole formed as the distal end opening portion 408*a* of the channel 408. The second hole 406*a*2 and the third hole 406*a*3 are formed as a pair of left and right illumination accommodation holes in which illumination optical system assembly members are installed. The fourth hole 406*a*4 is formed as an observation hole in which an observation optical system assembly member is installed.

An inner end of the first hole 406*a*1 is connected to a non-illustrated channel tube through the connection mouthpiece. A portion of this channel tube close to an operator's hand side is led to the operation unit 407 through the bending portion 405*b* and the flexible tube portion 405*a* and connected to the channel mouthpiece 407*d*. Furthermore, the channel 408 pierced from the channel mouthpiece 407*d* to the distal end opening portion 408*a* is formed. A non-illustrated surgical instrument is inserted into this channel 408, and the channel 408 is also used for air supply/water supply and others.

As shown in FIG. 19, the fourth hole 406*a*4 has a first lens (or cover glass) 414*a* that is arranged at the outermost distal end position of the fourth hole 406*a*4 and forms the observation window portion 52. A second lens 414*b*, a third lens 414*c*, and a fourth lens 414*d* are sequentially arranged behind this first lens 414*a*. The lenses 414*a*, 414*b*, 414*c*, and 414*d* are formed as an observation optical system 414. This observation optical system 414 is fixed on an inner peripheral wall surface of the fourth hole 406*a*4 by, for example, an adhesive. An imaging element portion 415 having an imaging element such as a CCD is arranged at an image forming position of the observation optical system 414.

Additionally, an observation image formed by the observation optical system 414 is converted into an electrical signal by the imaging element portion 415 and transmitted to the signal processing apparatus 403 through a non-illustrated signal cable. Further, the electrical signal (the observation image) is converted into a video signal by the signal processing apparatus 403 and output to the observation monitor 404. It should be noted that a distal end of an image guide fiber may be fixed in place of the imaging element portion 415. In this case, the observation image formed by the observation optical system 414 is led to the eyepiece portion through the image guide fiber and observed through the eyepiece portion.

Figure 20:
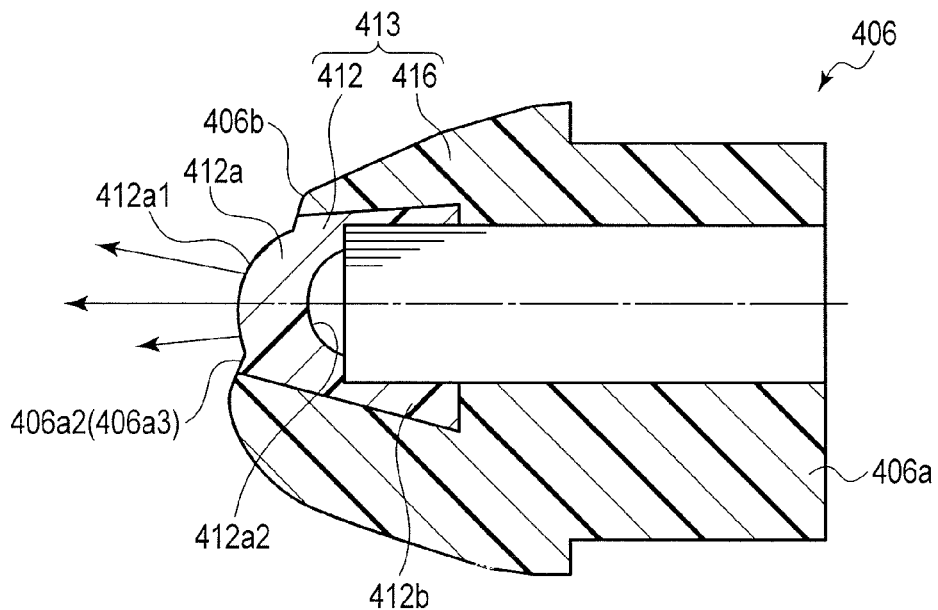
FIG. 20 is a cross-sectional view taken along line XX-XX in FIG. 18.

As shown in FIG. 20, each of the second hole 406*a*2 and the third hole 406*a*3 has an illumination lens 412 which is arranged at the outermost distal end position of each of holes 406*a*2 and 406*a*3 and forms each of the illumination window portions 51*a* and 51*b*. In this embodiment, there is formed a double-molded piece 413 in which the illumination lens 412 as an example of an optical member and the distal end portion main body 406*a* are integrally formed. The distal end portion main body 406*a* is formed as a support member 416 that supports the illumination lens 412.

In the double-molded piece 413 according to this embodiment, the illumination lens 412 is made of a resin for optical components that is often used in, for example, the medical field, which is an optically transparent resin such as polysulfone (PSU). Furthermore, the support member 416 is made of an optically opaque resin colored in, for example, black such as polysulfone (PSU). Moreover, the illumination lens 412 and the distal end portion main body 406*a* are integrally formed by injection molding based on double molding, i.e., a molding process in which the illumination lens 412 is subjected to the primary molding and then the distal end portion main body 406*a* as the support member 416 is subjected to the secondary molding. Since the support member 416 is optically opaque, it prevents unnecessary light from scattering from the outer peripheral portion of the illumination lens 412.

Additionally, as shown in FIG. 20, the illumination lens 412 according to this embodiment has a substantially circular lens main body 412*a* and a cylindrical cylinder wall portion 412*b* coupled with an outer peripheral region of this lens main body 412*a*. An outer surface of the lens main body 412*a* is an optical functional surface 412*a*1 having an inclined surface shape, and an inner surface of the lens main body 412*a* is a concave optical functional surface 412*a*2 having a concave curved shape. Further, the inclined surface 406*b* of the distal end portion main body 406*a* on the upper surface side and the optical functional surface 412*a*1 having the inclined surface shape are smoothly connected as the same surface without gaps.

Since the inclined surface 406*b* and the optical functional surface 412*a*1 are smoothly connected as the same surface, contamination does not enter a boundary portion of these surfaces.

Further, a large part of a main portion of a molding die for the double-molded piece 413 is the same as the first embodiment (FIG. 1 to FIG. 15). Therefore, a configuration of a primary molding die will be omitted, and an outline configuration of a main part of a secondary molding die 421 of the double-molded piece 413 will be described herein with Literature to FIG. 21. In FIG. 21, reference number 422 designates a second fixed die, and reference number 423 denotes a movable die. The illumination lens 412 is a primary molded portion. A second cavity 501 as a secondary molding cavity for the support member 416 is formed on a joint surface of the movable die 423 and the second fixed die 422. The support member 416 is an adjacent member of the illumination lens 412.

The movable die 423 has a movable insert 425 at a central part of a movable side die plate 424. Furthermore, after the primary molding, the illumination lens 412 as the primary molded portion is fitted and held on an upper surface of the movable insert 425.

A secondary fixed side die plate 426 of the second fixed die 422 has a hollow secondary fixed space 427 at a portion associated with the optical functional surface 412*a*1 having the inclined surface shape of the illumination lens 412. Further, a secondary fixed pressing and holding portion 427A arranged in the secondary fixed side die plate 426 abuts on the illumination lens 412 excluding the optical functional surface 412*a*1. It should be noted that reference number 431 represents a secondary molding sprue of the second fixed die 422.

Furthermore, the secondary fixed pressing and holding portion 427A has two air vents 427B. Each air vent 427B is a gap which achieves communication between an air trap portion that is arranged at a boundary portion of the illumination lens 412 as the primary molded portion and the support member 416 as the secondary molded portion and made of a second resin and the hollow secondary fixed space 427 portion, and into which the second resin cannot penetrate.

It should be noted that a manufacturing method of the double-molded piece 413 is basically the same as the first embodiment, and hence it will be omitted.

(Operation/Effect)

According to this embodiment, at the distal end portion 406 of the endoscope 401, the double-molded piece 413 is constituted of the illumination lens 412 and the support member 416, and the outer surface of the double-molded piece 413 is molded as a smooth surface without recessed portions. As a result, cleaning at the time of reuse is facilitated, and inexpensive sanitary endoscopic therapy is enabled.

Further, at the time of the secondary molding using the secondary molding die 421, in a state that the illumination lens 412 as the primary molded portion is fitted and held on the movable insert 425, the outer peripheral portion of the illumination lens 412 excluding the optical functional surface 412a1 is pressed and held by the movable die 423 and the secondary fixed pressing and holding portion 427A. At this time, since the secondary fixed space 427 is arranged at the position associated with the optical functional surface 412a1, the optical functional surface 412a1 does not come into contact with the inner wall surface of the second fixed die 422, and the secondary molding of the double-molded piece 413 is carried out.

At the time of the secondary molding of this double-molded piece 413, air is generated at a boundary portion between the illumination lens 412 and the support member 416. This air is discharged to the secondary fixed space 427 through the two air vents 417B abutting on the outer surface of the double-molded piece 413. At this time, an air vent transfer shape is molded on the outer surface of the illumination lens 412 excluding the optical functional surface 412a1 and the outer surface joining each air vent 417B.

As a result, in the secondary molding of the double-molded piece 413, the air in the secondary molding cavity is not compressed by an injection pressure of the molten resin, and the illumination lens 412 and the injection resin itself do not degenerate by heat of the compression. Therefore, it is possible to obtain the double-molded piece 413 in which chemical resistant performance or adhesion strength of the illumination lens 412 and the support member 416 is not deteriorated. Accordingly, erosion due to cleaning using chemicals at the time of reuse does not occur, and the safe endoscope 401 having sufficient adhesion strength can be provided.

Third Embodiment (Configuration)

Figure 22A:
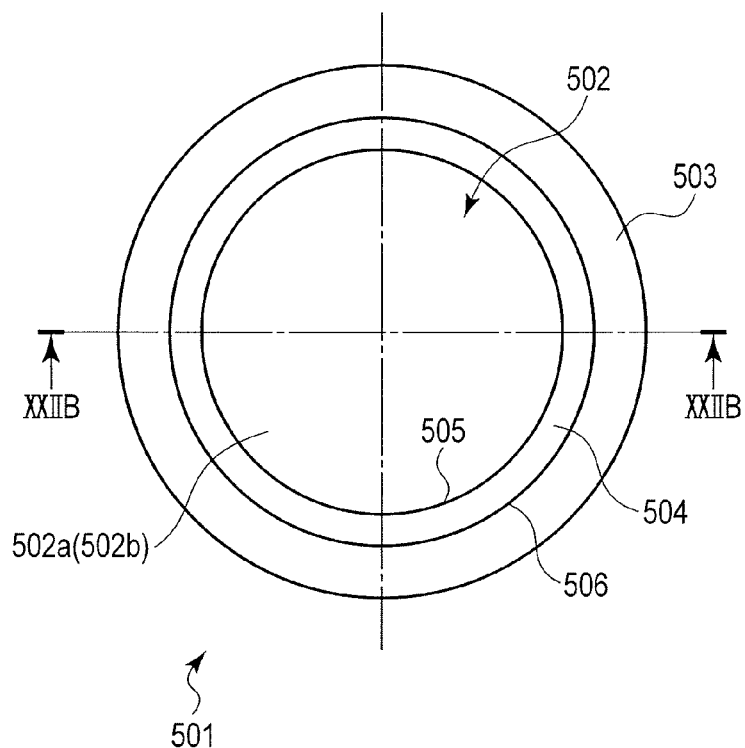
FIG. 22A is a top view showing a multicolored molded piece according to a third embodiment of the present invention.

It should be noted that the present invention is not restricted to the foregoing embodiments. In each embodiment, the application example where the multicolored molded piece is applied to the double-molded piece 3 shown in FIG. 2 or the double-molded piece 413 shown in FIG. 20 has been described, but the present invention is not necessarily restricted to the double-molded piece. For example, as described in a third embodiment shown in FIG. 22A and FIG. 22B, the multicolored molded piece may be applied to a triple-molded piece 501 or, although not shown, it may be applied to a multicolored molded piece having four or more colors.

The triple-molded piece 501 according to this embodiment is formed of an integrated matter obtained by integrating an optical element (a first molded portion) 502 which is, for example, an optical lens, a cylindrical colored outer peripheral portion (a second molded portion) 503 which is a lens frame holding this optical element 502, and a ring-shaped intermediate layer (a third molded portion) 504 arranged between the optical element 502 and the colored outer peripheral portion 503. Here, the optical element 502 is formed by injection-molding a first resin which is a resin material having optical transparency. The colored outer peripheral portion 503 is arranged to be away from the optical element 502, and it is formed by injection-molding a second resin different from the first resin. The intermediate layer 504 is arranged between the optical element 502 and the colored outer peripheral portion 503, and it is formed by injection-molding a third resin different from the first resin and the second resin between the optical element 502 and the colored outer peripheral portion 503.

Here, at the time of injection molding of the triple-molded piece 501, a first thermally fused and joined portion 505 joined in a thermally fused and mixed state is formed on a joining interface of the optical element 502 and the intermediate layer 504. Moreover, a second thermally fused and joined portion 506 likewise joined in a thermally fused and mixed state is formed on a joining interface of the intermediate layer 504 and the colored outer peripheral portion 503.

Figure 22B:
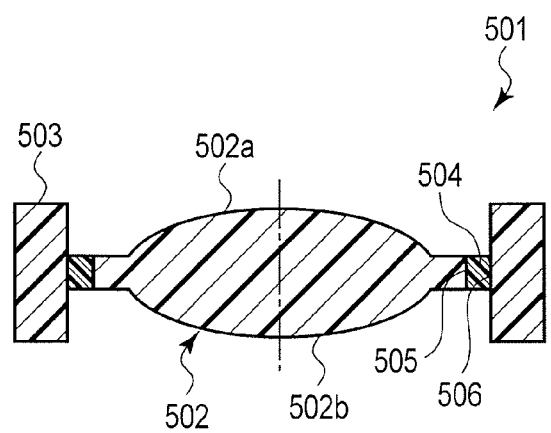
FIG. 22B is a cross-sectional view taken along line XXIIB-XXIIB in FIG. 22A.

As shown in FIG. 22B, the optical element 502 has two surfaces facing each other, and these two surfaces function as optical functional surfaces 502a and 502b, respectively. As shown in FIG. 22B, the optical element 502 has the first optical functional surface 502a having a convex curved shape on the upper side and the second optical functional surface 502b having a convex curved shape on the lower side. The colored outer peripheral portion 503 functions as positioning in a non-illustrated lens barrel at the time of disposing the triple-molded piece 501 to the lens barrel.

In a movable die of a molding die for the triple-molded piece 501, a movable insert is arranged at a central part of a movable side die plate. Furthermore, after primary molding, the optical element 502 as a primary molded portion is fitted and held on an upper surface of this movable insert.

A secondary fixed side die plate of a second fixed die of a secondary molding die has a hollow secondary fixed space associated with the first optical functional surface 502a. Moreover, a secondary fixed pressing and holding portion abuts on the optical element 502 excluding the first optical functional surface 502a.

Additionally, the secondary fixed pressing and holding portion of the second fixed die has two air vents. Each air vent is a gap which achieves communication between an air trap portion that is arranged at a boundary portion of the optical element 502 as a primary molded portion and the intermediate layer 504 as a tertiary molded portion and made of a third resin and the hollow secondary fixed space portion, and into which the second resin cannot penetrate. It should be noted that the air vent is a gap which achieves communication between an air trap portion that is arranged at a boundary portion of the colored outer peripheral portion 503 as a secondary molded portion and the intermediate layer 504 as the tertiary molded portion and made of the third resin and the hollow secondary fixed space portion, and into which the second resin cannot penetrate.

(Operation/Effect)

The triple-molded piece 501 according to this embodiment is molded by the same manufacturing method as each of the foregoing embodiments. Additionally, at the time of secondary molding using the secondary molding die, the optical element 502 which is the primary molded portion is fitted and held on the movable insert in the movable die. In this state, the outer peripheral portion of the optical element 502 excluding the first optical functional surface 502a is pressed and held by the movable die and the secondary fixed pressing and holding portion of the second fixed die. At this time, the secondary fixed space of the second fixed die is arranged at the position associated with the first optical functional surface 502a. Therefore, the first optical functional surface 502a does not come into contact with the wall surface of the second fixed die, and the secondary molding of the triple-molded piece 501 is carried out.

At the time of the secondary molding of this triple-molded piece 501, air is generated at a boundary portion between the optical element 502 and the intermediate layer 504 and a boundary portion between the intermediate layer 504 and the colored outer peripheral portion 503. The air is discharged to the secondary fixed space through the two air vents. At this time, an air vent transfer shape is molded on the outer surface of the optical element 502 excluding the first optical functional surface 502a and the outer surface of the optical element 502 joining each air vent.

Consequently, at the time of the secondary molding of the triple-molded piece 501, air in the secondary molding cavity is not compressed by an injection pressure of the molten resin, and the optical element 502 and the injection resin itself are not degenerated by heat of the compression. Therefore, it is possible to obtain the triple-molded piece 501 in which chemical resistant performance or adhesion strength of the optical element 502 and the colored outer peripheral portion 503 is not deteriorated. Accordingly, erosion due to cleaning using chemicals at the time of reuse does not occur, and the safe endoscope having sufficient adhesion strength can be provided.

Additionally, it is needless to say that various modifications can be carried out without departing from the essence of the present invention.

Other characteristic technical matters of the invention in this application are additionally described as follows.
Note (Additional Note 1)
A double molding die comprising:
a movable side die;
a first fixed side die which has a first fixed side runner through which a first resin flows, and defines a first cavity between the first fixed side die and the movable side die, in which an optical element made of the first resin and having at least an optical functional surface is molded; and
a second fixed side die which defines a second cavity between the second fixed side die and the movable side die, in which a secondary molded portion is molded with use of a second resin different from the first resin with respect to the molded optical element,
the double molding die being configured to mold a double-molded piece with use of the movable side die, the first fixed side die, and the second fixed side die,
wherein the second fixed side die has a hollow shape and abuts on the optical element excluding the optical functional surface.

(Additional Note 2)
The double molding die according to Additional Note 1, wherein the second fixed side die has air vents.

(Additional Note 3)
A molding method of a double-molded piece for molding the double-molded piece, comprising:
a primary molding step of molding an optical element having an optical functional surface by using a first cavity defined between a movable side die and a first fixed side die;
a movable side die movement step of moving the optical element from the first cavity to a second cavity, which is defined between the movable side die and a hollow second fixed side die abutting on the optical element excluding the optical functional surface, in accordance with movement of the movable side die; and
a secondary molding step of molding a secondary molded portion by using the second cavity, and integrating the secondary molded portion with the optical element after the movement.

(Additional Note 4)
The molding method of a double-molded piece according to Additional Note 3,
wherein the second fixed side die has air vents, and
at the secondary molding step, a gas generated at the time of secondary molding is discharged to the outside of the second cavity through the air vents.

(Additional Note 5)
A double-molded piece molded by using the molding method of a double-molded piece according to Additional Note 3 or Additional Note 4.

The present invention is effective in a technical field that uses a molding die for multicolored molding configured to combine and integrate different resins, a molding method of a multicolored molded piece, and a multicolored molded piece, or in a technical field producing them.

The present invention is not restricted to the foregoing embodiments as it is, and constituent elements can be modified and embodied without departing from the essence of the embodying stage. Further, appropriately combining constituent elements disclosed in the foregoing embodiments enables forming various inventions.

What is claimed is:

1. A double molding die, comprising:
a first molding die for forming an optical element having an outer wall portion and an optical functional surface, the first molding die including a first fixed die and a first movable die which are moveable relative to one another to move the first molding die between open and closed positions, the first molding die defining a first cavity when the first molding die is in its closed position, the first fixed die having a first runner through which a first resin may be introduced into the first cavity to form the optical element; and
a second molding die for forming a lens frame which surrounds and is integral with the outer wall portion of the optical element, the second molding die including a second fixed die and a second movable die which are moveable relative to one another to move the second molding die between open and closed positions such that when the optical element is located in the second molding die and the second molding die is in its closed position, the second molding die holds the optical element in place with a first space surrounding the outer wall portion and a second space surrounding, and out of contact with, the entire optical functional surface such that no portion of the optical functional surface touches any portion of the second molding die, the second fixed die including a second runner through which a second resin, which is different from the first resin, can be introduced into the first space to form the lens frame.

2. The double molding die according to claim 1, further including an air vent extending from the first to the second space, the dimensions of the air vent being sufficiently large to allow air to pass from the first space to the second space but sufficiently small to prevent the second resin from flowing from the first space to the second space.

3. The double molding die according to claim 1, wherein the optical element is a lens and the optical functional surface is curved surface.

4. The double molding die according to claim 3, wherein the curved surface is a convex surface which extends into the second space and does not contact any portion of the second molding die.

5. The double molding die according to claim 1, wherein the optical element has a first surface surrounding the optical functional surface and a second surface and the optical element is held in place in the second die, when the second molding die is in its closed position, by a support surface of the second fixed die which contacts the first surface of the optical element and a support surface of the second movable die which contacts the second surface of the optical element.

6. A method of forming an article using a double molding die having first and second molding dies, each molding die including a fixed die and a movable die so that each mold is movable between open and closed positions, the method comprising:
   injecting a first resin into the first molding die while the first molding die is in its closed position to form an optical element having an outer wall portion and an optical functional surface;
   removing the optical element from the first molding die;
   placing the optical element into the second molding die while the second molding die is in its open position;
   closing the second molding die such that the optical element is held in place with a first space surrounding the outer wall portion and a second space surrounding, and out of contact with, the entire optical functional surface; and
   introducing a second resin, which is different than the first resin, into the first space so as to form a lens frame which surrounds and is integral with the outer wall portion of the optical element.

7. A double molded piece molded by using the molding method of a multicolored molded piece according to claim 6.

8. The method of forming an article according to claim 6, wherein the second molding die includes an air vent extending from the first to the second space, the dimensions of the air vent being sufficiently large to allow air to pass from the first space to the second space but sufficiently small to prevent the second resin from flowing from the first space to the second space.

9. A double molded piece molded by using the molding method according to claim 8.

10. The method of forming an article according to claim 6, wherein the optical element is a lens and the optical functional surface is curved surface.

11. The method of forming an article according to claim 10, wherein the curved surface is a convex surface which extends into the second space and does not contact any portion of the second molding die.

12. The method of forming an article according to claim 6, wherein the optical element has a first surface surrounding the optical functional surface and a second surface and the optical element is held in place in the second die, when the second molding die is in its closed position, by a support surface of the fixed die of the second molding die which contacts the first surface of the optical element and a support surface of the movable die of the second molding die which contacts the second surface of the optical element.

13. A double molding die, comprising:
   a first molding die for forming an optical element having an outer wall portion and an optical functional surface, the first molding die including a first fixed die and a first movable die which are moveable relative to one another to move the first molding die between open and closed positions, the first molding die defining a first cavity when the first molding die is in its closed position, the first fixed die having a first runner through which a first resin may be introduced into the first cavity to form the optical element; and
   a second molding die for forming a secondary molded portion around and integral with the outer wall portion of the optical element, the second molding die including a second fixed die and a second movable die which are moveable relative to one another to move the second molding die between open and closed positions such that when the optical element is located in the second molding die and the second molding die is in its closed position, the second molding die holds the optical element in place with a first space surrounding the outer wall portion and a second space surrounding, and out of contact with, the entire optical functional surface such that no portion of the optical functional surface touches any portion of the second molding die, the second fixed die including a second runner through which a second resin, which is different from the first resin, can be introduced into the first space to form the secondary molded portion, and
   wherein the optical element has a first surface surrounding the optical functional surface and a second surface and the optical element is held in place in the second die, when the second molding die is in its closed position, by a support surface of the second fixed die which contacts the first surface of the optical element and a support surface of the second movable die which contacts the second surface of the optical element.

14. The double molding die according to claim 13, further including an air vent extending from the first to the second space, the dimensions of the air vent being sufficiently large to allow air to pass from the first space to the second space but sufficiently small to prevent the second resin from flowing from the first space to the second space.

15. The double molding die according to claim 13, wherein the optical element is a lens and the optical functional surface is curved surface.

16. The double molding die according to claim 15, wherein the curved surface is a convex surface which extends into the second space and does not contact any portion of the second molding die.

* * * * *